(12) United States Patent
Hiura

(10) Patent No.: US 6,332,793 B1
(45) Date of Patent: Dec. 25, 2001

(54) CABLE REEL

(75) Inventor: Yasuhiro Hiura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/614,716

(22) Filed: Jul. 12, 2000

(30) Foreign Application Priority Data

Jul. 13, 1999 (JP) .................................................. 11-198488

(51) Int. Cl.[7] .................................................. H01R 35/04
(52) U.S. Cl. .................................................. 439/164
(58) Field of Search ....................................... 439/164, 15

(56) References Cited

U.S. PATENT DOCUMENTS

| | | | |
|---|---|---|---|
| 5,766,019 | * | 6/1998 | Matsumoto et al. .................. 439/164 |
| 5,769,649 | * | 6/1998 | Welschholz et al. ................. 439/164 |
| 5,993,228 | * | 11/1999 | Kubota .................................. 439/164 |
| 6,041,677 | * | 3/2000 | Reh et al. ............................. 439/164 |
| 6,053,742 | * | 4/2000 | Matsumoto et al. .................. 439/164 |

\* cited by examiner

*Primary Examiner*—Gary F. Paumen
(74) *Attorney, Agent, or Firm*—Greenblum & Bernstein, P.L.C.

(57) ABSTRACT

A fixed case of a cable reel having a bolt hole perpendicular to an axis is formed without using a slide-type mold, by providing a first groove, which has a U-shaped notch opening from a lower end side of a mounting seat. The mounting seat is formed as a step in a radial direction from the area of the lower end of a fixed wall area and protrudes downwards along the direction of an axis from a peripheral wall of a fixed case. A step area covers an opening of a lower end side of the first groove, and a second groove has a U-shaped notch opening from an upper end side onto the step area. A bolt hole is formed in a direction perpendicular to an axis having an inner perpendicular surface of which the total periphery is closed by the first groove and the second groove. The bolt hole is formed by mating molds from the upper and lower sides and having a mold separating face at the center of the bolt hole.

2 Claims, 5 Drawing Sheets

CABLE REEL

BACKGROUND OF THE INVENTION

1. Field of the Invention

The present invention relates to a cable reel, and more specifically, to simplification of the structure of the molds to be used for molding a fixed case by improving the form of the fixed case of the cable reel.

2. Description of Background Information

An automobile with an air bag is illustrated in FIG. 5(A) and houses an air bag 6 on a hub 5a of a steering wheel 5. An air inflator 7 for expanding air bag 6 is mounted thereon. Furthermore, a cable reel or rotary connector 1 for housing a flat cable 9 for providing, for example, a signal for activating inflator 7 is also mounted around hub 5a. In addition, on hub 5a of steering wheel 5, one end 8a of steering shaft 8 is covered with a steering shaft cover 4, which transmits a rotation of the steering wheel 5 to front wheels of the automobile (not illustrated).

Cable reel 1 is equipped with, as illustrated in FIG. 5(B), a movable body 2 and a fixed case 3 formed of resin. Flat cable 9 is housed in cable housing area 3f of fixed body 3 in a spirally coiled manner. Flat cable 9 includes one end 9a being fixed to movable body 2 and connected with inflator 7 through the connector, while the other end is fixed to fixed body 3 and connected to an external circuit (not illustrated) through the connector.

Movable body 2 of cable reel 1 is fixed to steering wheel 5 and rotates with the rotation of steering wheel 5 in left/right directions. The rotation is followed by flat cable 9, which tightens or releases its coiled condition inside the cable housing area 3f of the fixed case 3.

Fixed case 3 of cable reel 1, as shown in FIG. 6, is mounted on steering shaft cover 4 by tightening bolt 10 in screw hole 4b of holder 4a which is fixed onto steering shaft cover 4. In order to insert bolt 10, fixed case 3 includes bolt hole 3a on a stepped protruded area 3c at the end of fixed wall area 3b which covers the steering shaft cover 4.

Since the direction of hole 3a (y direction indicated by the arrow in FIG. 6) is perpendicular to the direction of the mold (x direction indicated by an arrow in FIG. 6) used for molding fixed case 3, the bolt hole 3a makes it difficult to use a normal mold. Therefore, by using a slide-type mold 15 and mold 16 (shown with two-dot chain line in FIG. 6), having a slide core 15a, the fixed case 3 is formed by matching respective molds at separation surface Z. Because mold 15 of this slide-type has a movable area, production of the mold is higher in cost compared with that of a conventional mold, and it causes dimensions of the mold itself to be larger in size. Furthermore, problems of production cost relating to the cable reel become higher, requiring a larger-size molding machine to mount the slide-type mold.

SUMMARY OF THE INVENTION

The present invention was made to solve the problems mentioned above, and, therefore, an object is to form a fixed case by using conventional molds without using higher-cost slide-type fixing molds, by the arrangement of the bolt hole on the fixed case of the cable reel.

In order to solve the aforementioned problems, the present invention provides a cable reel, wherein a movable body fixed to a steering wheel side and a fixed case is mounted on a steering shaft cover fixed to a vehicle side. A flat cable is housed in a spiral form in an annular cable housing space formed by the movable body and the fixed case. A peripheral wall extends in a downward axial direction and has a lower fixed wall area. A mounting seat protrudes in the form of a step from the lower fixed wall area.

A first groove has a U-shaped notch extending from and having an opening at a lower end of the mounting seat and a step which covers an opening of the U-shaped notch. A second groove has a U-shaped notch extending from an upper side of the step. The first and second grooves form a bolt hole having an inner peripheral face, the entire periphery of the inner peripheral face being closed by the first and second grooves. A bolt passes through the bolt hole, whereby a bolt inserted into the bolt hole is fastened into a screw hole of the steering shaft cover. The steering shaft cover interfits with the fixed wall area, thereby fixing the fixed case onto the steering shaft cover.

According to another aspect of the invention, the fixed case is resin-molded by a pair of molds, with a mold separating face being formed at a central position of the bolt hole.

Another aspect of the invention is to provide a method of molding a fixed case of a cable reel. The fixed case includes a peripheral wall extending in a downward axial direction and has a lower fixed wall area. A mounting seat protrudes in the form of a step from the lower fixed wall area, and a first groove having a U-shaped notch extends from and has an opening at a lower end of said mounting seat. A step covers an opening of the U-shaped notch, and a second groove has a U-shaped notch extending from an upper side of the step. The first and second grooves form a bolt hole, the bolt hole having an inner peripheral face. The entire periphery of the inner peripheral face is closed by the first and second grooves. The method comprises providing a pair of molds to form the fixed case so that a mold separating face is formed at a central part of the bolt hole.

The U-shaped first and second grooves have openings in opposite directions from each other at positions where bolts of a mounting seat on the fixed case are inserted, the direction of the openings being set in the same direction as the mating direction of the molds. A fixed case having a bolt hole can thus be formed without using slide-type molds. More specifically, by directing the U-shaped opening of the first groove towards a lower end side, and also directing the opening of the U-shaped second groove in an upper end side, each direction of the opening extends in the same direction as the mating direction of mold separation, which enables molding to be performed by a normal two-piece mold set, thus allowing smooth taking-out of a molded fixed case. In addition, the use of normal molds makes the dimension of the mold set itself smaller in size, thereby allowing for the adoption of a smaller-size molding machine instead of using a larger machine.

Further, with the present invention, the aforementioned fixed case allows resin molding by use of a pair of molds, which features the separating face of the molds at the central position of bolt hole. Adoption of this feature permits ease of production of the molding position of the first and the second groups, thereby making it easy to take out a molded cable reel from the mold.

DETAILED DESCRIPTION OF THE PREFERRED EMBODIMENTS

Figure 1A:
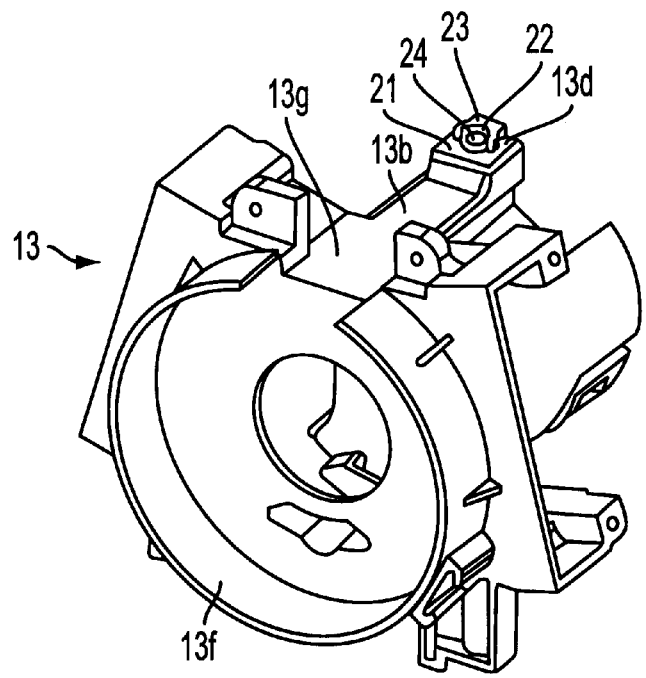
FIG. 1(A) is a perspective view of a fixed case of a cable reel of the present invention.
Figure 1B:
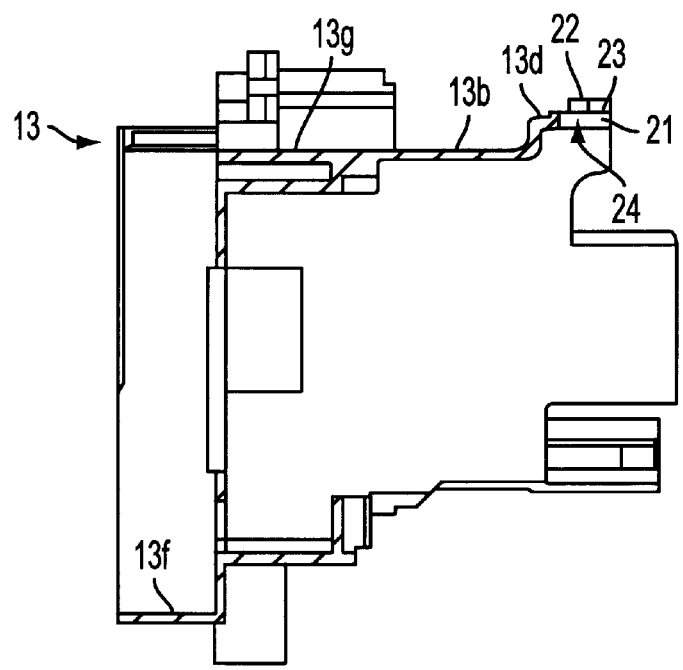
FIG. 1(B) is a sectional view thereof.

A description of the embodiment of the present invention follows with reference to the drawings. Same references are also applied to members previously described. FIGS. 1(A) and 1(B) show a fixed case 13 of a cable reel of the present invention, which is molded of resin. The cable reel includes a similar movable body as the one conventionally used and fixed to the steering wheel side, and fixed case 13. Fixed case 13 is mounted on a steering shaft cover which is fixed on a vehicle body, and a flat cable 3 is housed in a spiral form inside the annular cable housing area 13f formed by the movable body and fixed case 13. The structure of the steering wheel, etc., for mounting a cable reel is similar to the one conventionally employed.

The whole arrangement of fixed case 13 is almost the same as that of the conventional fixed case, but is provided with fixed wall area 13b which protrudes downwards in a direction away from cable housing area 13f which is situated in an upper position along the axial direction form peripheral wall 13g of cable housing area 13f. In the area of the lower end of fixed wall area 13b, mounting seat 13d which protrudes as a step in a radial direction is provided.

Figure 2A:
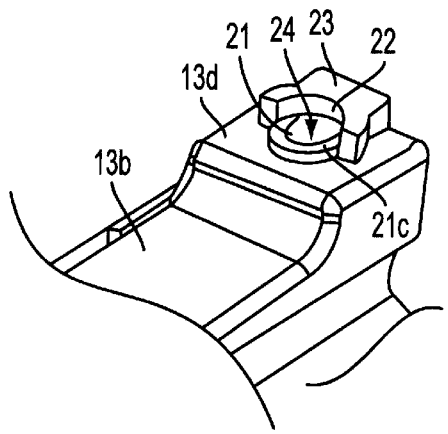
FIG. 2(A) is a perspective view of area of a bolt hole of the fixed case.
Figure 2B:
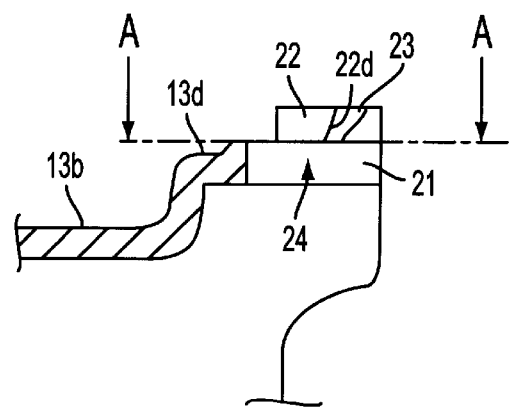
FIG. 2(B) is a sectional view.
Figure 2C:
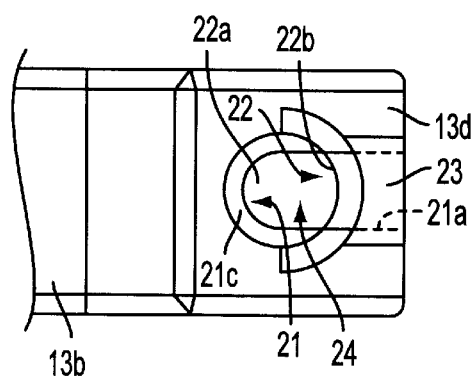
FIG. 2(C) is a plan view of FIG. 2(A)
Figure 2D:
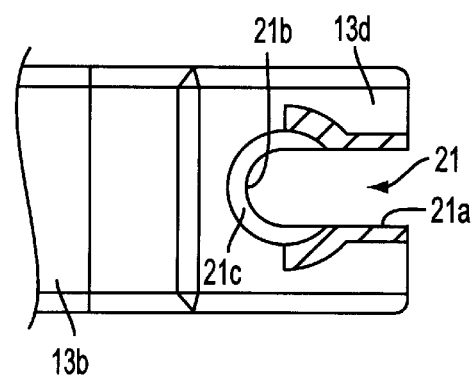
FIG. 2(D) is a sectional view along line A—A in FIG. 2(B)

On mounting seat 13d, as shown in FIGS. 2(A) to 2(D), first groove 21 is provided and has an opening 21a having a notch in a U-shape which is open from the lower end side. Groove 21 has, as illustrated in FIG. 2(D), a groove width which allows fixing bolt 10 of fixed case 13 to be inserted, and when the center of curved area 21b at the closed end of the U-shape mounts fixed case 13 onto steering shaft cover 4, it coincides with the center of screw hole 4b mounted on the steering shaft cover. In addition, the periphery of the first groove 21 is higher than the upper surface of mounting seat 13d, and provides a contact area 21c with bolt head area 10a of bolt 10.

On the upper surface of mounting seat 13d, step 23 covers opening 21a of the lower end side of first groove 21. Second groove 22 having an opening 22a is formed by a U-shaped notch from the end side of step 23. Second groove 22 has a width wide enough to accommodate the bolt head area 10a of bolt 10, the center of curved area 22b of the closed side corresponding with the center of curved area 21b of first groove 21. The inner peripheral surface 22d of this curved area 22b, as shown in FIG. 2(B), serves as a wide tapered surface which makes insertion of bolt 10 easier and promotes accommodation of bolt head area 10a therein, thus preventing backlash from occurring.

By combining first groove 21 and second groove 22 together, a bolt hole 24 is formed including an inner peripheral surface which encloses the total periphery in a direction axially perpendicular to the steering shaft 8. In this case, the bolt hole 24 is not restricted to this form, but may be an ellipsoidal hole by moving the curved area 21b to an upper end side or the curved area 22b to a lower end side, without making the central positions of curved areas 21b and 22b of the first groove 21 and the second groove 22, respectively, coincident.

Figure 3:
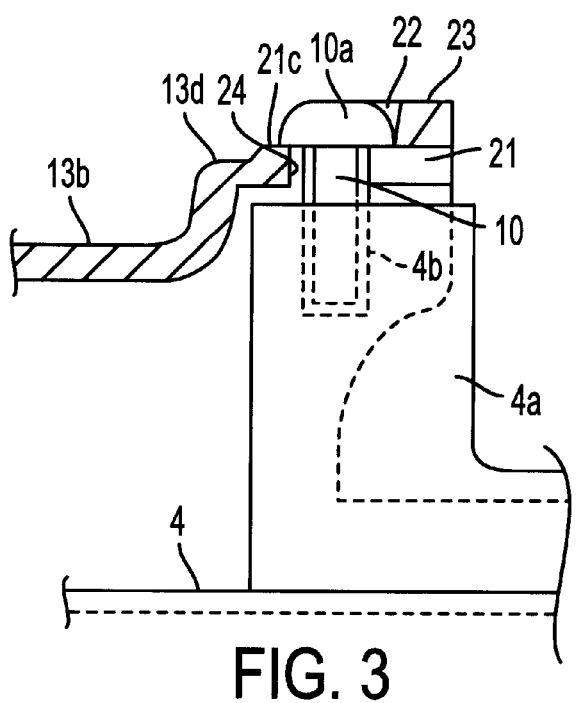
FIG. 3 is a sectional view showing the mounting condition using a bolt.

In order to mount fixed case 13 having bolt hole 24 to steering shaft cover 4, which interfits with fixed wall area 13b as shown in FIG. 3, fixing bolt 10 is guided in an inner-peripheral surface of first groove 21 and second groove 22, respectively, after insertion into bolt hole 24, and is fastened to screw hole 4b of holder 4a. Under this fastening condition, the lower surface of bolt head area 10a makes contact with contact area 21c and then bolt head area 10a is brought to the second groove 22.

Figure 4:
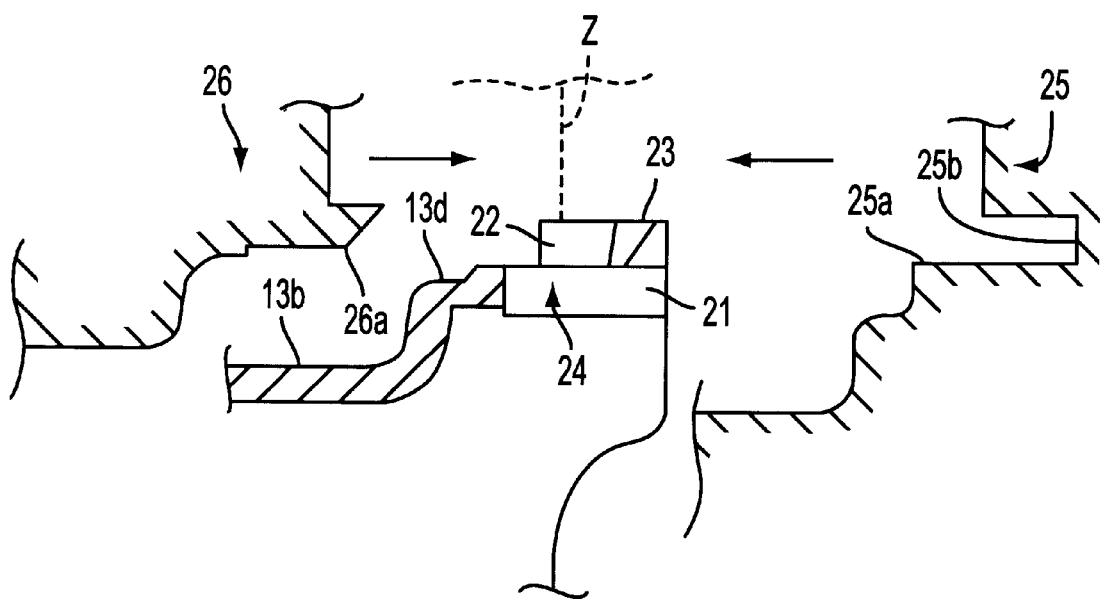
FIG. 4 is a schematic diagram showing the formation of the molds.
Figure 5A:
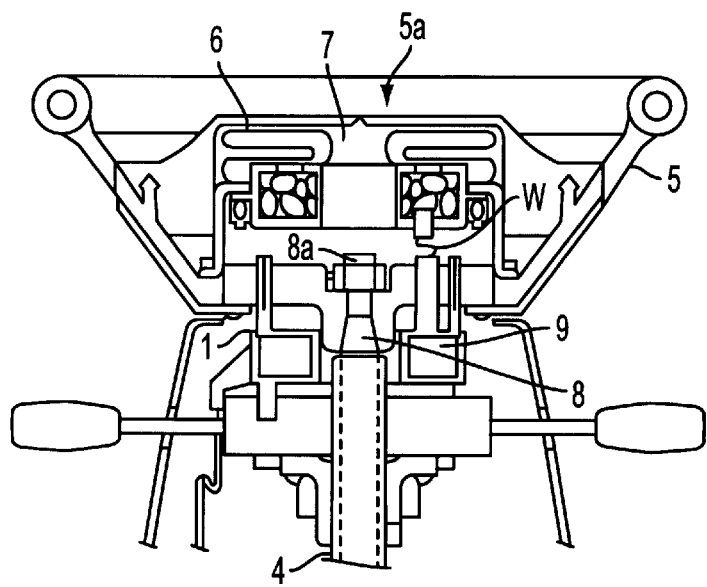
FIG. 5(A) is a schematic diagram of a conventional cable reel.
Figure 5B:
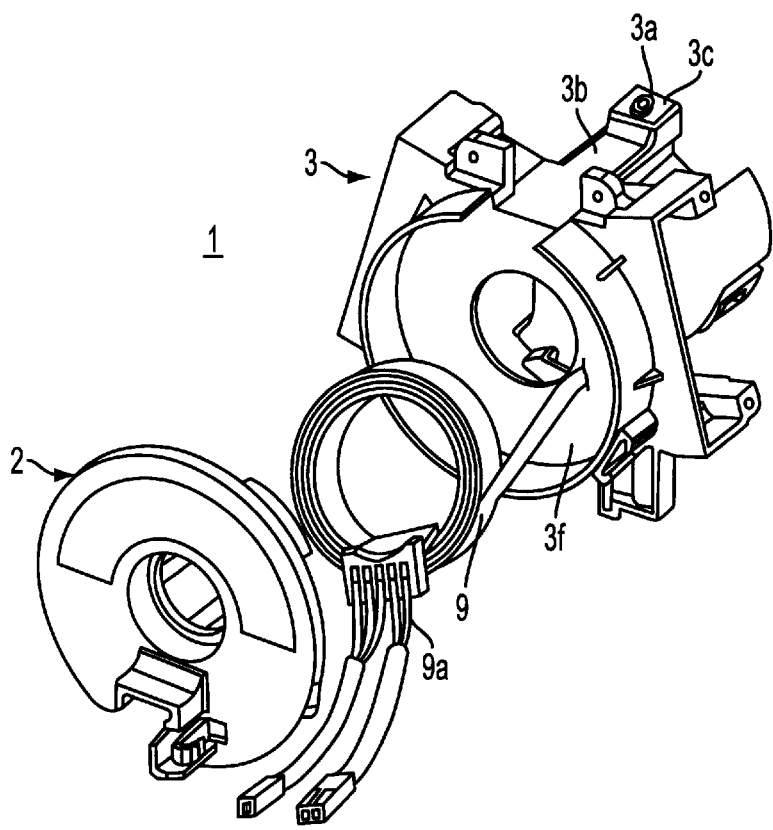
FIG. 5(B) is an exploded perspective view.
Figure 6:
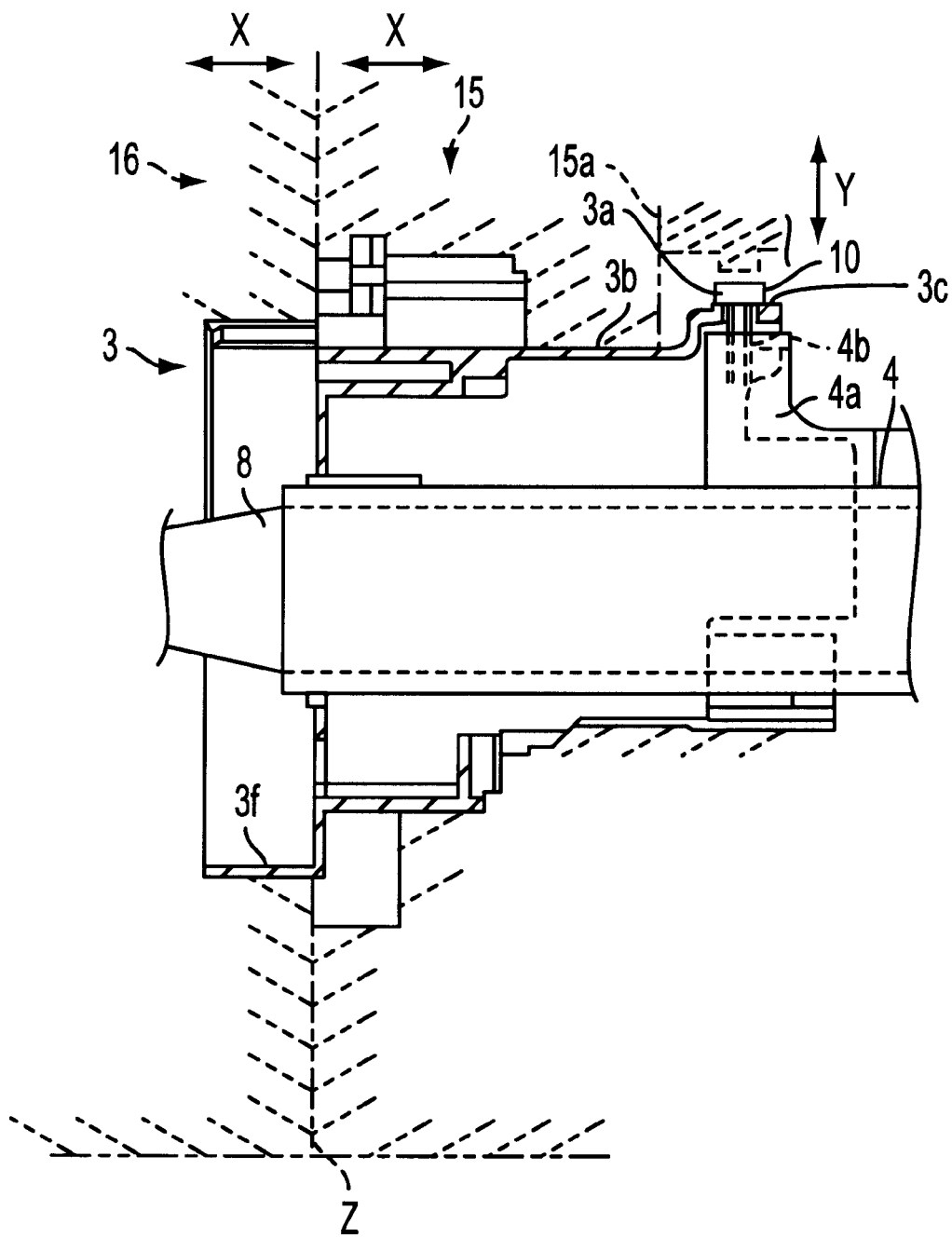
FIG. 6 is a schematic diagram showing a positional relationship of a mold and mounting arrangement of the fixed case.

On the other hand, forming a fixed case 13 of the cable reel is, as shown in FIG. 4, carried out using a pair of conventional first and second molds 25 and 26 that allow separation having a separating face Z at the central position of bolt hole 24 on the fixed case 13, instead of using a slide-type mold.

First mold 25 which is positioned in the lower side has first convex area 25a which protrudes in the same shape as the shape of first groove 21 in a mating direction of the molds, and the second mold 26 which is positioned in the upper side has, likewise, second convex area 26a in the same shape as the shape of second groove 22 with the upper side of first convex area 25a. In addition, a concave area 25b on first mold 25 is also provided for forming step area 23.

In order to mold a fixed case 13 by first mold 25 and second mold 26, first mold 25 and second mold 26 are mounted onto a molding machine (not illustrated), first and second molds 25 and 26 are mated together at the separating face Z, and resin is then injected. A fixed case 13 having first groove 21 and second groove 22 of the bolt hole 24 is thus formed. In this case, first mold 25 and second mold 26 are smaller in size than the conventional molds because the normal molds and a molding machine which mounts these molds can be compatible with machines smaller than the conventional machines.

With the molding of bolt hole 24, curved area 21 of first groove 21 is formed at the tip side of first convex area 25a, opening 21a is formed at the base side of first convex area 25a, and likewise, opening 22a and curved area 22b positioned at an upper side of the first groove 21 are formed at the base side and the tip side of second convex area 26a. In this case, first and the second molds 25 and 26 are not restricted to the aforementioned embodiment, but the separating face Z may be positioned at the boundary, or the like, between cable housing area 13f and peripheral wall 13g, instead of at the center of bolt hole 24 alone.

As is apparent from the above description, by fully working out the formation of the bolt hole on the fixed case of the cable reel, a fixed case having a bolt hole perpendicular to the axis can be formed using conventional molds that are not of a slide-type mold. In consequence, reduction in mold cost, smaller size molds, and wider scope of applicable molding machines leading to an efficient molding process can be achieved.

Although the invention has been described with reference to particular means, materials, and embodiments, it is to be understood that the invention is not limited to the particulars disclosed, and extends to all equivalents within the scope of the claims.

The present disclosure relates to subject-matter contained in priority Japanese Application No. HEI-11-198488, filed on Jul. 13, 1999, which is herein expressly incorporated by reference in its entirety.

What is claimed:

1. A cable reel having a movable body configured to be fixed to a steering wheel side of a vehicle and a fixed case mountable on a steering shaft cover configured to be fixed to a vehicle side, a flat cable being housed in a spiral form in an annular cable housing space formed by the movable body and the fixed case, said fixed case comprising:

a peripheral wall extending in a downward axial direction and having a lower fixed wall area, a mounting seat protruding in the form of a step from said lower fixed wall area;

a first groove having a U-shaped notch extending from and having an opening at a lower end of said mounting seat;

a step which covers an opening of said U-shaped notch;

a second groove having a U-shaped notch extending from an upper side of said step, said first and second grooves forming a bolt hole, said bolt hole having an inner peripheral face, the entire periphery of said inner peripheral face being closed by said first and second grooves; and a bolt passing through said bolt hole;

whereby a bolt inserted into said bolt hole is fastened into a screw hole of said steering shaft cover, said steering shaft cover interfitting with said fixed wall area, thereby fixing said fixed case onto said steering shaft cover.

2. A cable reel as set forth in claim 1, wherein said fixed case is resin-molded by a pair of molds, a mold separating face being formed at a central position of said bolt hole.

* * * * *